May 23, 1944.  H. C. BEHRENS  2,349,696
ROTARY STEAM JOINTS
Filed Oct. 29, 1942
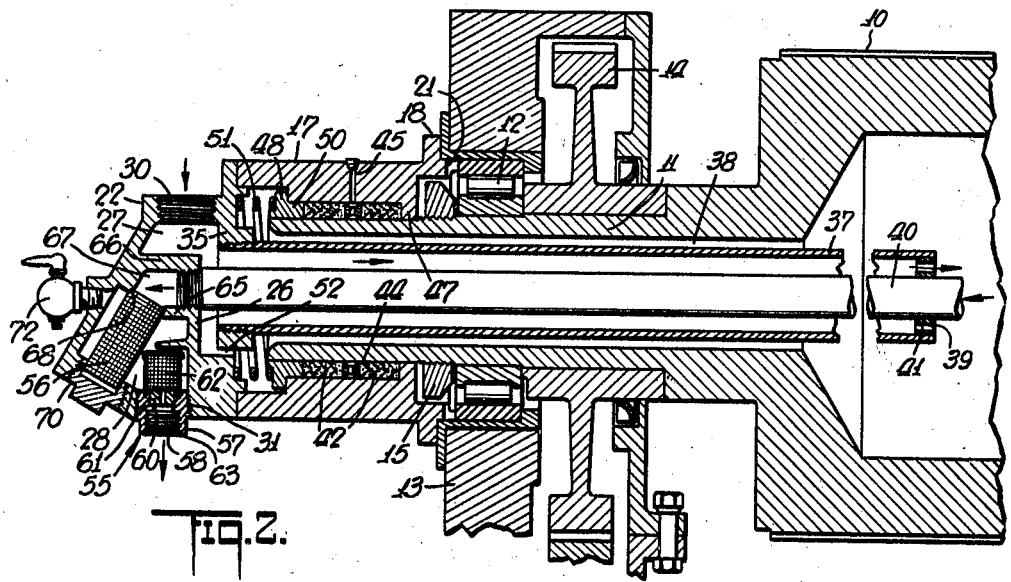
INVENTOR
*Herbert C. Behrens*
BY
*Dunn, Fairbank & Hirsch*
ATTORNEY Patented May 23, 1944

2,349,696

UNITED STATES PATENT OFFICE 2,349,696

ROTARY STEAM JOINT

Herbert C. Behrens, Haddon Heights, N. J., assignor to Samuel M. Langston Co., Camden, N. J., a corporation of New Jersey Application October 29, 1942, Serial No. 463,844

8 Claims. (Cl. 285—10)

The present invention relates to rotary pressure joints of the type used to admit steam or other heating fluid into rotatable hollow drums to heat said drums. Such joints, for instance, may be used for delivering steam to the corrugating rolls used in the manufacture of corrugated paper.

A joint of the general type referred to usually includes a casing or housing on the machine frame encircling the hollow journal of the drum, and having an inlet for delivering steam to the interior of the drum, and an outlet communicating with a syphon pipe extending into the interior of the drum. The extension of the joint outwardly from its supporting frame is considerable, so that the syphon pipe which is affixed at one end in said extension, and which has no other support along its length, has a comparatively long overhang. This causes excessive downward deflection of the syphon pipe so that its inner end strikes the inside of the drum, and thereby causes the pipe to be twisted off.

Also, in the usual type of rotary pressure joint, carbonization of the joint which oftens occurs, clogs the strainer and pressure regulators on the discharge side of the joint. The strainer and pressure regulators form separate units from the joint, and are connected thereto by pipes or nipples requiring disconnection when it is desired to replace or repair these units.

Also, in prior art constructions, flexible connections are employed to compensate for irregularities and misalignment between the steam joint and the rotatable drum to be heated. These flexible connections are expensive to manufacture, cause excessive stressing of the inlet and outlet fittings connected to the joint, and are a source of ready leakage.

One object of the present invention is to provide a new and improved rotary pressure joint having means for supporting the syphon pipe at widely spaced sections against movement transversely of the pipe, whereby the extent of unsupported overhang in said pipe is reduced to a minimum.

Another object is to provide a new and improved rotary pressure joint having means whereby the replacement or repair of its outlet strainers and regulators can be effected with minimum amount of effort and disconnection.

Another object is to provide a new and improve rotary pressure joint constructed so that the parts thereof have their axes fixed with respect to the axis of the rotatable drum in operative mounted position of said joint.

In carrying out the objects of the invention, the joint has a casing carrying a steam inlet line, which extends some distance into the drum to be heated. The syphon pipe extends concentrically in the steam pipe line and has its outer end secured to the casing. A collar near the outer end of the steam line embraces the syphon pipe to support said pipe at said end against transverse movement in all directions, and has apertures to permit flow of inlet steam therethrough into the drum.

As another feature, a pressure regulator and a removable strainer in advance of said regulator are removably built into the end wall of said casing to form a self-contained unit therewith.

Various other objects, features and advantages of the invention will be apparent from the following particular description, and from an inspection of the accompanying drawing, in which:

Fig. 1 is a section of a form of rotary pressure joint embodying the present invention and shown in conjunction with a corrugating roll;

Fig. 2 is an end view of the rotary pressure joint shown in Fig. 1;

Fig. 3 is a section of another form of rotary pressure joint embodying the present invention; and Fig. 4 is a section of still another form of rotary pressure joint embodying the present invention.

Referring to Figs. 1 and 2 of the drawing, there is shown a form of my improved rotary steam joint connected to one of the hollow corrugating rolls 10 of a paper corrugating unit. This roll 10 has a hollow journal 11 communicating with the interior of said roll and supported in a bearing 12 carried by the side frame 13 of the machine. A nut 15 threaded on the journal 11 clamps the bearing 12 in position against the hub of a gear 14 which drives the roll 10.

The rotary steam joint in the construction of Figs. 1 and 2 includes a casing having a body portion 17 provided at one end with a radial flange 18 removably secured to the machine frame 13 by means of studs 20 or the like, and with a cylindrical rim 21 extending snugly in an opening in said frame. The casing at its outer end has a cap 22 removably secured to the body portion 17 by studs 23 or the like. The cap also has a partition wall 26 dividing said casing into a steam inlet chamber 27 and an exhaust chamber 28. The chamber 27 has an opening 30 threaded for attachment to a steam supply pipe. The exhaust chamber 28 has on the side of the cap 22 opposite the inlet opening 30 a threaded opening 31 for the attachment of an outlet plug connection as will be more fully described.

The cap 22 has a wall 35 into which is secured one end of a rigid steam inlet pipe 37 extending axially of the joint within the roll journal 11 and reaching some distance into the roll 10 from the inlet steam chamber 27. This pipe 37 is smaller than the roll journal 11 to form therewith an annular steam space 38.

A syphon pipe 40 of smaller diameter than the steam pipe 37 extends through the latter pipe concentrically thereof, and is secured at its outlet end in the cap partition wall 26. The free end of this syphon pipe 40 within the roll extends downwardly into the condensate collected in the roll 10 in a manner well-known in the art. A collar 41 secured in the discharge end of the steam pipe 37 has a series of apertures 39 permitting steam flow into the roll 10, and a central opening for snugly receiving the syphon pipe 40, so that said syphon pipe is firmly supported not only at its outlet end in the cap partition wall 26, but also by the steam pipe 37 in the interior of the roll 10. This arrangement cuts down materially the amount of overhang in the syphon pipe 40 and reduces the sag of deflection of said pipe sufficiently to prevent its contact with the interior wall of the roll 10.

For sealing the joint against steam leakage, suitable sealing packing desirably in the form of expansible neoprene rings 42 are arranged in an annular space between the peripheral wall of the casing 17 and the roll journal 11, and are separated longitudinally into two groups by a grease lantern 44, communicating with a lubricating feed duct 45 in said casing wall. A flange 47 extending radially inwardly of the peripheral casing wall forms an abutment for one end of the packing rings 42. At the other end a flanged metal pressure ring 48 loosely encircling the outer end of the roll journal 11 has a cylindrical section 50, which extends between said journal and the peripheral casing wall, and which is slidably urged against the packing rings 42 by a coil spring 51. When the steam is turned on, this steam acting on the pressure ring 48 presses said ring against the packing rings 42 with a force depending on the steam pressure, thereby insuring a tight joint. Steam finds its way into contact with the pressure ring 48 through apertures 52 in the cap wall 35.

The housing or casing 17 is mounted in fixed concentric position with respect to the axis of the rotatable drum 10, so that the inlet section 30, outlet section 31 and syphon pipe 40 are supported in fixed relationship to the frame or bearing retaining means 13 encircling the drum journal 11. If there is any slight misalignment between the drum journal 11 and the joint, the packing 42 in conjunction with the pressure ring 48 will compensate for this misalignment without affecting the fluid tight connection between said joint and said journal. Any vibratory impulses imparted to the joint are resisted by the frame 13 so that these impulses are not transmitted to the oinlet and outlet fittings connected to the joint.

In the form of rotary joint shown in Figs. 1 and 2, there is provdied a pressure regulator 55 and a strainer 56 in advance of said regulator to remove sediment and other foreign materials which are carried by the exhaust steam or condensate, and which are apt to clog up said regulator. This regulator 55 forms a self-contained part of the joint readily accessible for replacement or repair. For that purpose, this regulator 55 comprises a plug 57 threaded in the opening 31 and having a threaded discharge aperture 58 for attachment to a suitable discharge pipe, an orifice plate 60 seated in an annular recess 61 in said plug, and a cylindrical strainer 62 secured to said plug over said orifice plate. A cylindrical extension 63 on the plug 57 beyond the general contour of the cap 22 affords sufficient length to permit an efficient pipe connection with said plug, and at the same time presents sufficient body for convenient handling in the operation of connecting or disconnecting said plug.

A strainer 56 which is cylindrical and larger than the regulator strainer 62 extends across the path of return flow in advance of the regulator 55 to prevent clogging of the regulator strainer 62. For supporting this main strainer 56, the partition wall 26 has an integral flange 65 extending into the discharge chamber 28, and forming with an offset section 66 of said partition wall 26 a duct 67 communicating with the discharge end of the syphon pipe 40. The wall of the duct 67 at its outlet end has an annular recess 68 to receive one end of the strainer 56. The other end of the strainer 56 is seated in the recess of a plug 70 threaded in an opening in the cap 22. The outer end of this plug 70 is square or otherwise suitably shaped to receive a turning tool. A pet cock 72 screwed into the end of the cap 22 and communicating with the exhaust chamber 67 permits the testing of the discharge flow and thereby affords an easy and expeditious way of determining the condition of the strainer 56 and of the pressure regulator 55 without disconnecting said units.

The strainer 56 is positioned alongside of the regulator 55 on the same side of the joint axis, and is inclined inwardly with respect to said axis so that the cap is made as small, compact and light as is feasible with efficient operation and structural stability.

In operation, line steam is delivered through inlet 30 into chamber 27, through the annular space between the pipes 37 and 40, and through apertures 39 into the roll 10 to heat said roll. The steam which condenses in the roll collects at the bottom of the roll and returns through the depending end offset section of the syphon pipe 40, through the horizontal section of said pipe into the duct 67, through the strainers 56 and 62 and out through the exhaust opening 58.

In the form shown in Fig. 3, the partition 26a which divides the cap 22a into a steam inlet chamber 27a and exhaust chamber 28a has integral therewith a flange 65a extending into said exhaust chamber and forming with a section of said partition wall a duct 67a communicating with the discharge end of the syphon pipe 40. An annular ridge 80 forming the extreme outer end of the wall of the duct 67a and projecting from the flange 65a in partition wall 66a has a recess presenting an annular seat 68a for one end of the main cylindrical strainer 56a. The outer end of this strainer 56a is fitted in the recess in plug 70a threaded in an opening in the cap 22a, and may be affixed to said plug for removal therewith or may extend loosely in said plug recess. The steam inlet chamber 27a has an inlet opening 30a threaded for attachment to an inlet pipe connection, and the exhaust chamber 28a has an opening 31a alongside of said inlet opening and threaded for the attachment of the pressure regulator 55a. The strainer 56a is disposed above and on the side of said axis opposite to the regulator 55a, and is inclined inwardly towards said axis.

With both inlets and outlets of the joint on the bottom side of the cap 22a, the lengths of the pipe connections and elbows to these outlets will be reduced to a minimum, and with the strainer plug 70a on top, this plug will be readily accessible for easy removal.

In the form shown in Fig. 4, the cap 22b is of simpler construction, in that the strainer and the pressure regulator do not form built-in units of the joint, but are connected to the pipes leading from the outlets of the joint. The cap 22b has a partition 26b dividing the cap into a steam inlet chamber 27b and an exhaust chamber 28b with respective threaded openings 30b and 31b on opposite sides of the joint axis. This partition 26b has an axial section 85 substantially at right angles to the axis of the joint and outer sections 86 and 87 inclined in the same general direction with respect to said axis. In all other respects, the joint is similar to that shown in Figs. 1 to 3 with the syphon pipe 40 supported at its discharge end in the cap, and supported near its other end against transverse movement in all directions by the collar 41 in the steam pipe 37.

As many changes can be made in the above apparatus, and many apparently widely different embodiments of this invention can be made without departing from the scope of the claims, it is intended that all matter contained in the above description or shown in the accompanying drawings shall be interpreted as illustrative and not in a limiting sense.

What is claimed is:

1. A steam joint for a hollow rotatable steam heated drum including a casing, a packing ring on the inner periphery of said casing adapted to sealably embrace the journal of said drum, a slidable pressure ring bearing against said packing ring and in communication with the steam admitted into said joint, and means for supporting said casing in fixed relationship to the axis of said drum.

2. In combination, a drum having a tubular journal rigid therewith, a drum support having a bearing intermediate of the ends of said journal, means on said journal and between said drum and said bearing for rotating said journal and drum, a cap enclosing the outer end of said journal and rigidly secured to said support, said cap having separate intake and exhaust chambers, a pair of pipes extending through said journal, one connected to one of said chambers and the other to the other chamber, and a packing ring encircling said journal and within said cap, said cap having an annular space at the outer end of said packing ring and communicating with the interior of said drum through said journal and along the exterior of said pipes.

3. In combination, a drum having a tubular journal rigid therewith, a drum support having a bearing intermediate of the ends of said journal, a cap enclosing the outer end of said journal and rigidly secured to said support, said cap having separate intake and exhaust chambers, a pair of pipes extending through said journal, one connected to one of said chambers and the other to the other chamber, and a packing ring encircling said journal and within said cap, said cap having an annular space at the outer end of said packing ring and communicating with the interior of said drum through said journal and along the exterior of said pipes.

4. The combination with a hollow rotatable drum having a tubular axis and a drum support having a bearing for said journal intermediate of the ends of the latter, of a cap enclosing the outer end of said journal, and secured to and supported by said drum support, a pair of pipes secured to and supported by said cap and projecting through said journal, said cap having a steam supply connection with one of said pipes, an exhaust connection with the other pipe and a packing ring between the exterior of said journal adjacent the outer end thereof and the interior of the peripheral wall of said cap and having its outer end subjected to the action of the steam pressure in said drum transmitted through said journal along the exterior of said pipes.

5. In combination, a drum having a tubular journal, a drum support having a bearing intermediate of the ends of said journal, a cap rigidly secured to and supported by said drum support and enclosing the outer end of said journal, a packing encircling the outer end of said journal and encircled by the peripheral wall of said cap intermediate of the ends of the latter, a pair of pipes secured to and supported by said cap and projecting through said journal into said drum for conducting steam into and withdrawing exhaust from said drum.

6. In combination, a drum having a tubular journal, a drum support having a bearing intermediate of the ends of said journal, a cap rigidly secured to and supported by said drum support and enclosing the outer end of said journal, a packing encircling the outer end of said journal and encircled by the peripheral wall of said cap intermediate of the ends of the latter, and resilient means between the outer end wall of said cap and said packing for applying pressure to the latter.

7. In combination, a drum having a tubular journal, a drum support having a bearing intermediate of the ends of said journal, a cap rigidly secured to and supported by said drum support and enclosing the outer end of said journal, a packing encircling the outer end of said journal and encircled by the peripheral wall of said cap intermediate of the ends of the latter, a pair of pipes secured to and supported by said cap and projecting through said journal into said drum for conducting steam into and withdrawing exhaust from said drum, said packing preventing the escape of steam from said drum to said bearing.

8. In combination, a drum having a tubular journal, a drum support having a bearing intermediate of the ends of said journal, a cap rigidly secured to and supported by said drum support and enclosing the outer end of said journal, a packing encircling the outer end of said journal and encircled by the peripheral wall of said cap intermediate of the ends of the latter, and a pipe secured to and supported by said cap and extending through said journal.

HERBERT C. BEHRENS.